(12) United States Patent
Weber et al.

(10) Patent No.: US 11,204,142 B2
(45) Date of Patent: Dec. 21, 2021

(54) LIGHT FIXTURE ASSEMBLY FOR A STREET LIGHT FIXTURE

(71) Applicant: TE CONNECTIVITY CORPORATION, Berwyn, PA (US)

(72) Inventors: Ronald Martin Weber, Annville, PA (US); Matthew Edward Mostoller, Hummelstown, PA (US)

(73) Assignee: TE CONNECTIVITY SERVICES GmbH, Schaffhausen (CH)

( * ) Notice: Subject to any disclaimer, the term of this patent is extended or adjusted under 35 U.S.C. 154(b) by 0 days.

(21) Appl. No.: 16/855,285

(22) Filed: Apr. 22, 2020

(65) Prior Publication Data
US 2020/0355335 A1 Nov. 12, 2020

Related U.S. Application Data

(60) Provisional application No. 62/844,540, filed on May 7, 2019.

(51) Int. Cl.
*F21S 8/08* (2006.01)
*F21V 23/04* (2006.01)
(Continued)

(52) U.S. Cl.
CPC .......... *F21S 8/086* (2013.01); *F21V 23/0464* (2013.01); *F21V 25/02* (2013.01); *F21V 23/026* (2013.01);
(Continued)

(58) Field of Classification Search
CPC .. F21S 8/086; F21S 8/088; F21S 8/085; F21S 9/02; F21S 6/005; F21W 2131/103;
(Continued)

(56) References Cited

U.S. PATENT DOCUMENTS 4,878,160 A * 10/1989 Reneau ................ E04H 12/003
362/269
5,371,442 A * 12/1994 Siems .................... H05B 41/00
315/227 R
(Continued)

FOREIGN PATENT DOCUMENTS

CN     208 634 953 U     3/2019
DE     201 07 023 U1     8/2001
(Continued)

OTHER PUBLICATIONS

International Search Report, International Application No. PCT/IB2020/054094, International Filing Date, Apr. 30, 2020.

*Primary Examiner* — Jong-Suk (James) Lee
*Assistant Examiner* — James M Endo

(57) ABSTRACT

A street light fixture includes a street light pole having a base and a head end opposite the base supporting a street light head. The street light fixture includes a light fixture assembly having a head assembly, a base assembly and a wire assembly. The head assembly is received in the street light head and includes a light engine. The base assembly is received in a base cavity of the base of the street light pole and includes a power controller that receives power from power feed wires. The wire assembly has power supply wires extending between the street light head and the base of the street light pole. The power supply wires are coupled to the power controller and are coupled to the light engine to supply power from the power controller to the light engine.

20 Claims, 5 Drawing Sheets

(51) Int. Cl.
*F21V 25/02* (2006.01)
*F21Y 115/10* (2016.01)
*F21W 131/103* (2006.01)
*F21V 23/02* (2006.01)
*F21V 33/00* (2006.01)

(52) U.S. Cl.
CPC ...... *F21V 33/006* (2013.01); *F21W 2131/103* (2013.01); *F21Y 2115/10* (2016.08)

(58) Field of Classification Search
CPC ...... F21V 23/02; F21V 23/023; F21V 23/026; F21V 23/001; F21V 23/002; F21V 23/003; F21V 23/006; F21V 23/007; F21V 23/008; F21V 23/009; F21V 17/02; F21V 33/006
See application file for complete search history.

(56) References Cited

U.S. PATENT DOCUMENTS

| | | | | |
|---|---|---|---|---|
| 6,204,446 B1* | 3/2001 | Parduhn | ............... | E04H 12/003 174/45 R |
| 7,059,096 B2* | 6/2006 | Kuebler | ............... | E04H 12/003 174/45 R |
| 7,219,873 B2* | 5/2007 | Harwood | ........... | E04H 12/2261 181/171 |
| 7,361,039 B2* | 4/2008 | Koehler | ........... | H01R 13/629 439/207 |
| 7,570,481 B2* | 8/2009 | Sett | .......... | H02B 1/50 174/541 |
| 7,790,995 B2* | 9/2010 | Burkett | ................. | H01R 13/70 200/61.41 |
| 2004/0037084 A1* | 2/2004 | Ginsburg | ............... | F21S 8/086 362/431 |
| 2004/0094318 A1* | 5/2004 | Koessler | ................. | H02G 3/14 174/50 |
| 2005/0174762 A1* | 8/2005 | Fogerlie | ................. | F21S 8/086 362/183 |
| 2009/0168438 A1* | 7/2009 | Haddad | ................... | F21V 21/10 362/363 |
| 2010/0302779 A1* | 12/2010 | Chemel | ............... | H05B 47/155 362/249.02 |
| 2012/0230004 A1* | 9/2012 | Atchley | .................. | H02G 9/06 361/825 |
| 2013/0077327 A1* | 3/2013 | Butler | ................. | F21V 23/023 362/431 |
| 2013/0223065 A1* | 8/2013 | Hsieh | ..................... | F21V 23/02 362/235 |
| 2017/0122546 A1* | 5/2017 | Abbott | .................... | F21V 33/00 |
| 2018/0098379 A1* | 4/2018 | Chiang | .................. | H05B 47/19 |

FOREIGN PATENT DOCUMENTS

| | | |
|---|---|---|
| DE | 20 2015 106372 U1 | 12/2015 |
| FR | 2 950 669 A1 | 4/2011 |
| JP | H10 14056 A | 1/1998 |
| JP | 2004 335418 A | 11/2004 |
| KR | 200 465 645 Y1 | 3/2013 |

* cited by examiner

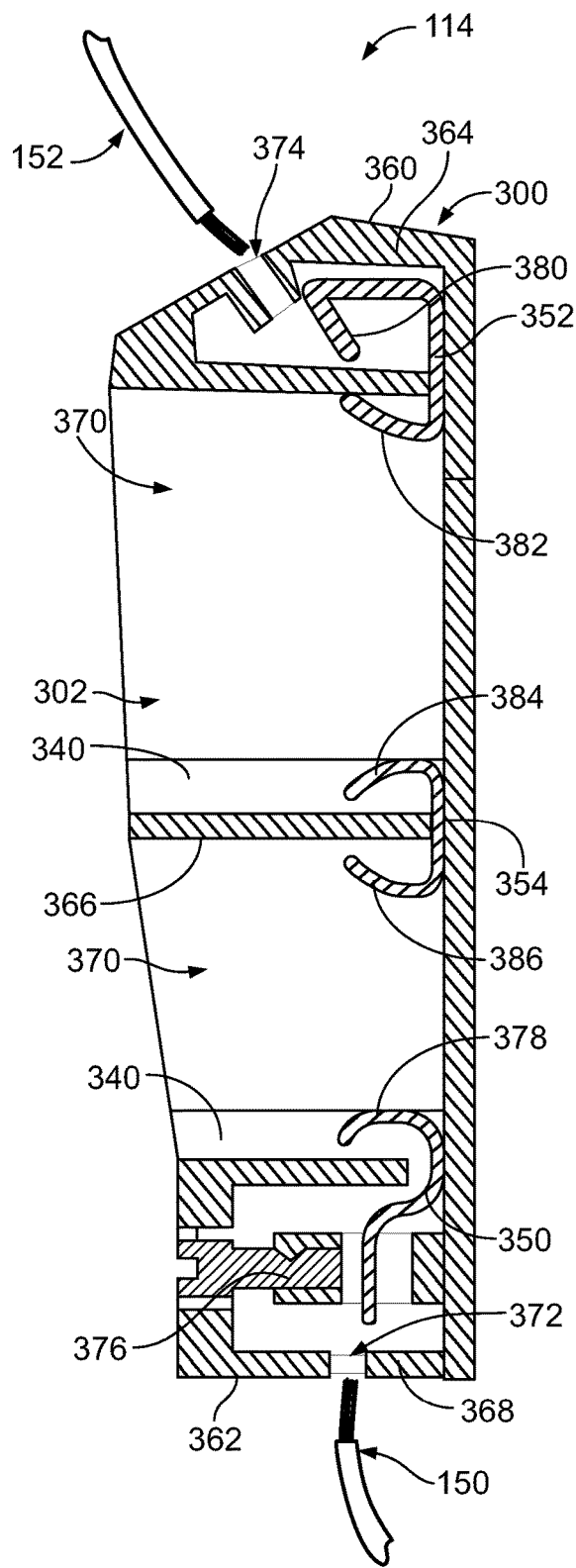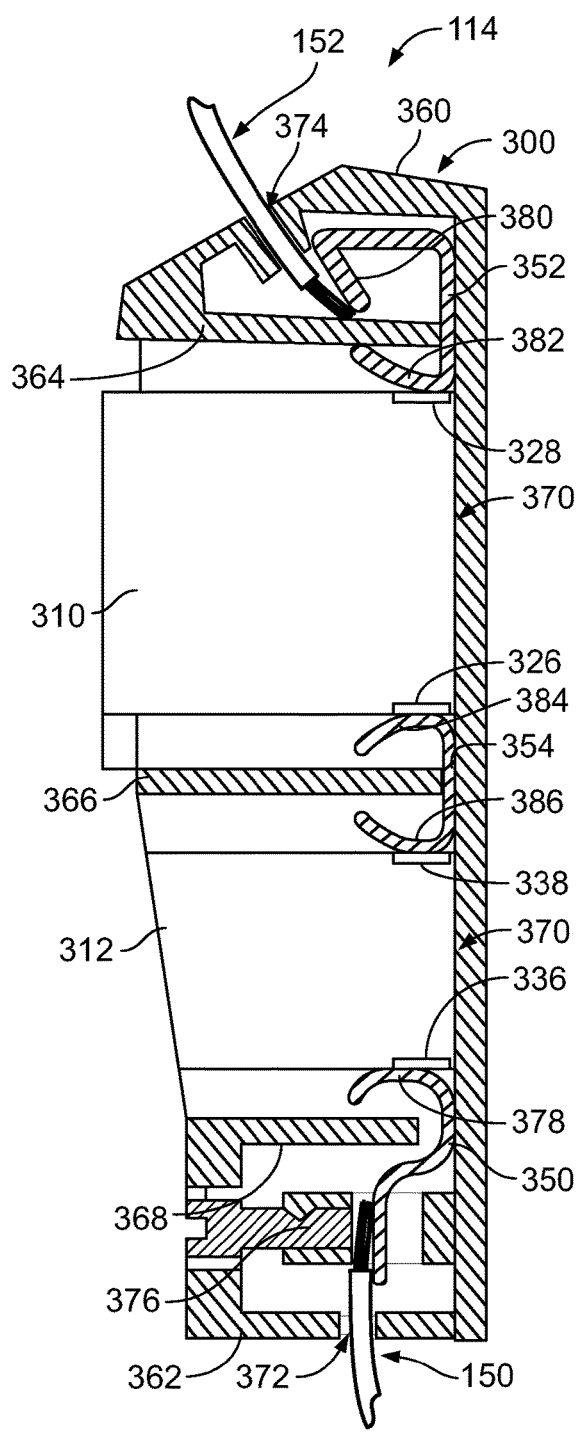
FIG. 5
FIG. 6

LIGHT FIXTURE ASSEMBLY FOR A STREET LIGHT FIXTURE

CROSS REFERENCE TO RELATED APPLICATIONS

This application claims benefit to U.S. Provisional Application No. 62/844,540, filed 7 May 2019, titled "LIGHT FIXTURE ASSEMBLY FOR A STREET LIGHT FIXTURE", the subject matter of which is herein incorporated by reference in its entirety.

BACKGROUND OF THE INVENTION

The subject matter herein relates generally to street light fixtures.

Street light fixtures include a street light head mounted to a top of a street light pole. A light assembly with LEDs or other light sources is located in the street light head to generate light for illuminating the street. Power feed wires extend through the street light pole to the street light head. The power feed wires are electrically connected to a power control device, such as an LED driver, to control the light assembly. However, electrical components of the light assembly may fail over time and need to be repaired or replaced. Replacement of electrical components, such as the power control device, are time consuming and require multiple service technicians to perform the repair. For example, the electrical components are contained within the street light head, which is located high above the ground level and are inaccessible from the ground. A boom or lift is required to access the electrical components for the service. Typically, multiple service technicians are needed, such as one service technician to make the repair, another service technician to operate the boom or lift, and another service technician to control or direct traffic when the street is shut down for the service.

A need remains for a street light fixture that may be repaired in a cost effective and reliable manner.

BRIEF DESCRIPTION OF THE INVENTION

In an embodiment, a street light fixture is provided. The street light fixture includes a street light head having a cavity. The street light head has a lens. The street light fixture includes a street light pole having a base and a head end opposite the base. The street light head is provided at the head end of the street light pole. The base has a base cavity located remote from the street light head. The street light fixture includes a light fixture assembly having a head assembly, a base assembly and a wire assembly. The head assembly is received in a cavity of the street light head. The head assembly includes a light engine positioned proximate to the lens for generating light from the street light fixture. The base assembly is received in the base cavity of the base of the street light pole remote from the street light head. The base assembly includes a power controller that receives power from power feed wires feeding power to the street light fixture. The wire assembly has power supply wires extending between the street light head and the base of the street light pole. The power supply wires are coupled to the power controller and are coupled to the light engine to supply power from the power controller to the light engine.

In another embodiment, a light fixture assembly for a street light fixture is provided. The light fixture assembly includes a head assembly received in a cavity of a street light head of the street light fixture. The head assembly includes a light engine for generating light from the street light fixture. The light fixture assembly includes a base assembly separate and discrete from the head assembly. The base assembly is received in a street light pole at a base of the street light pole remote from the street light head. The base assembly includes a power controller to receive power from power feed wires feeding power to the street light fixture. The light fixture assembly includes a wire assembly having power supply wires configured to extend between the street light head and the base of the street light pole. The power supply wires are coupled to the power controller and the light engine to supply power from the power controller to the light engine.

In a further embodiment, a light fixture assembly for a street light fixture is provided. The street light fixture assembly includes a head assembly that is configured to be received in a cavity of a street light head of the street light fixture. The head assembly includes a light engine for generating light from the street light fixture. The light fixture assembly includes a base assembly separate and discrete from the head assembly. The base assembly is received in a street light pole at a base of the street light pole remote from the street light head. The base assembly includes a housing having a chamber. The housing holds power terminals configured to be electrically connected to power feed wires feeding power to the street light fixture. The housing holds supply terminals. The base assembly includes a power controller pluggable into the chamber to electrically connect to the power terminals and the supply terminals. The power controller controls a power supply from the power terminals to the supply terminals. The light fixture assembly includes a wire assembly having power supply wires configured to extend between the street light head and the base of the street light pole. The power supply wires are coupled to the supply terminals. The power supply wires are coupled to the light engine. The power supply wires supply power from the power controller to the light engine.

BRIEF DESCRIPTION OF THE DRAWINGS

FIG. 5 is a cross-sectional view of a portion of the base assembly in accordance with an exemplary embodiment.

FIG. 6 is a cross-sectional view of the base assembly in accordance with an exemplary embodiment.

DETAILED DESCRIPTION OF THE INVENTION

Figure 1:
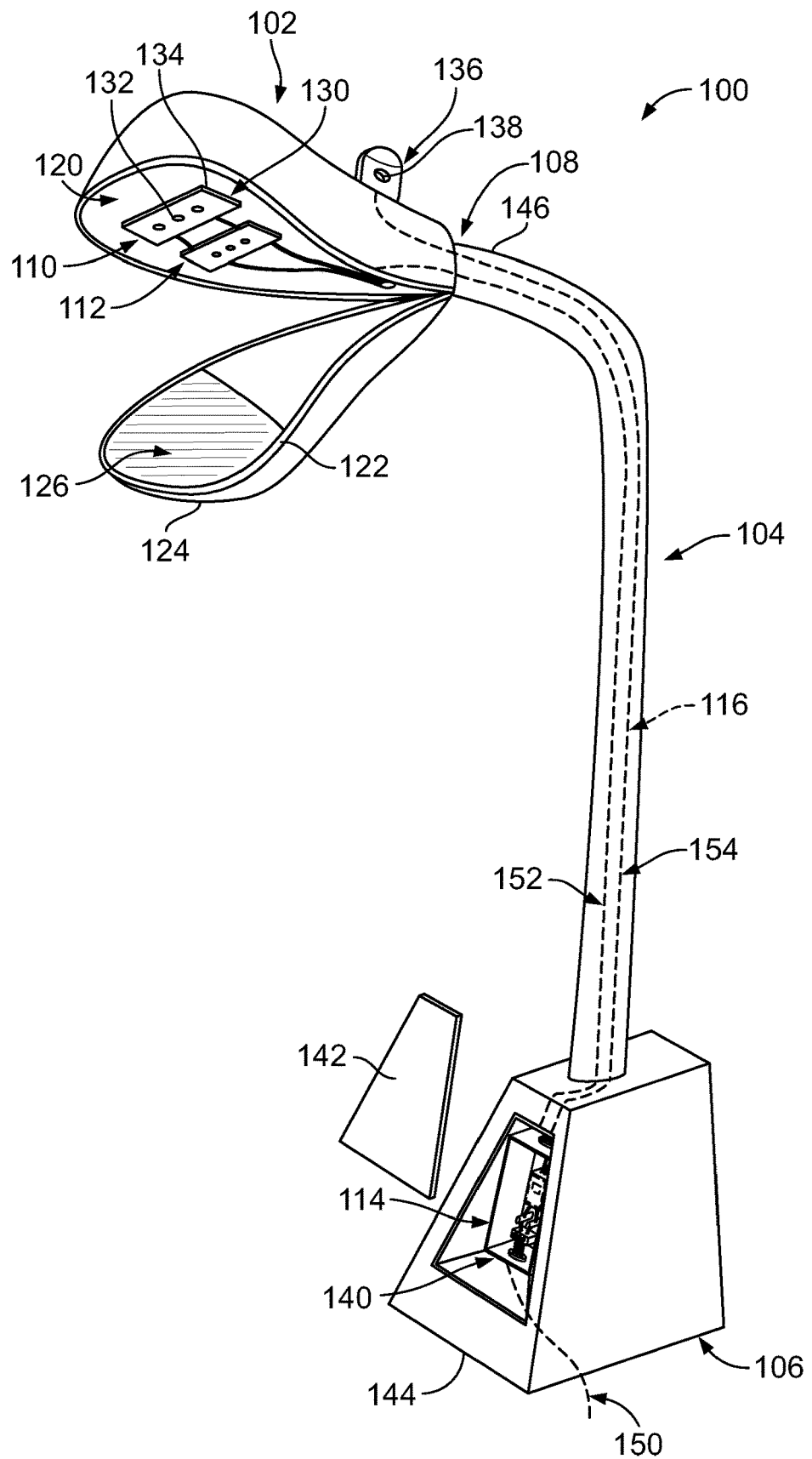
FIG. 1 illustrates a street light fixture in accordance with an exemplary embodiment.

FIG. 1 illustrates a street light fixture 100 in accordance with an exemplary embodiment. The street light fixture 100 includes a street light head 102 provided at an end of a street light pole 104. The street light pole 104 has a base 106 at a ground level and a head end 108 opposite the base 106 at an above-ground level. The street light head 102 is provided at the head end 108 of the street light pole 104. The base 106 at the ground level is accessible by a technician standing on the ground. The street light head 102 at the above ground level is inaccessible by a technician standing on the ground. Rather, the street light head 102, at the above ground level, is only accessible by a lift, boom or other means to lift the technician up into the air to access the street light head 102. For example, the street light head 102 may be 5 meters or more up in the air at the above ground level.

The street light fixture 100 includes a light fixture assembly 110 providing illumination for the street light fixture 100. The light fixture assembly 110 includes a head assembly 112, a base assembly 114 and a wire assembly 116 between the head assembly 112 and the base assembly 114. The head assembly 112 is provided at the street light head 102. The base assembly 114 is provided at the street light pole 104, such as at or near the bottom of the street light pole 104.

In an exemplary embodiment, the head assembly 112 is received in a cavity 120 of the street light head 102. The head assembly 112 is covered by a lid 122 at a bottom 124 of the street light head 102. The lid 122 seals the cavity 120. In an exemplary embodiment, the lid 122 has a lens 126 at the bottom 124 to allow the light to illuminate from the bottom 124.

The head assembly 112 includes a light engine 130 positioned proximate to the lens 126 for generating light from the street light fixture 100. The light engine 130 includes one or more light sources for generating the light. In the illustrated embodiment, the light engine 130 is an LED light engine having one or more LEDs 132 mounted to a circuit board 134. Other types of light engines 130 may be used in alternative embodiments.

In an exemplary embodiment, the head assembly 112 includes a control module 136 having an environmental sensor 138 sensing environmental characteristics of the environment exterior of the street light head 102. For example, the environmental sensor 138 may be a photocell sensing daylight levels exterior of the street light head 102. Other types of environmental sensors 138 may be provided in alternative embodiments, such as temperature sensors, humidity sensors, motion sensors, sound sensors, particulate sensors, and the like. The control module 136 may control operation of the light fixture assembly 110 in various embodiments. For example, the control module 136 may control turning on the street light fixture 100 or turning off the street light fixture 100. The control module 136 may communicate with other components, such as a central control system. The communication may be wireless, cellular or wired. In the illustrated embodiment, the control module 136 is mounted to the top of the street light head 102; however, other mounting locations are possible in alternative embodiments. The control module 136 may include other components, such as a camera, or other smart street light components.

The base assembly 114 is received in a base cavity 140 of the street light pole 104. In various embodiments, the base cavity 140 may be defined in a ground level wiring vault (not shown) positioned alongside the street light pole 104 at the base 106. The ground level wire vault is open to the interior of the street light pole 104 for running wires into and out of the ground level wiring vault. In an exemplary embodiment, the base assembly 114 includes electronics for controlling the street light fixture 100. The base assembly 114 is accessible at the ground level to repair or replace the electronics of the street light fixture 100 without needing to access the street light head 102. For example, the base assembly 114 may include at least one power controller, such as an LED driver for controlling power supply of the street light fixture 100 and/or a power driver for auxiliary devices. For example, the power drivers may be for auxiliary powered components at the street light head 102, such as cameras, wireless transceivers, environmental sensors, and the like. The power drivers may be for auxiliary powered components at the street light base 104, such as for a pole-mounted charging station for electric vehicles or other AC power accessory at the base 106. The base assembly 114 may include circuit protection devices, such as surge protectors, fuses, and the like. The base assembly 114 is covered by an access cover 142, which may be secured using special fasteners or hardware to limit access to the base assembly 114, such as to technicians with special tools to remove the hardware. The base assembly 114 may be sealed with a cover and other sealing elements providing environmental protection to the devices enclosed within the base assembly 114.

The street light pole 104 extends between a bottom 144 and a top 146. In an exemplary embodiment, the street light pole 104 is a tubular metal pole having a hollow interior for running the wire assembly 116 between the bottom 144 and the top 146. In alternative embodiments, the street light pole 104 is a solid core pole, such as a wooden pole, and the wire assembly 116 is routed in a conduit along an exterior of the street light pole 104. The street light head 102 is provided at the top 146 of the street light pole 104 high above the ground. The bottom 144 of the street light pole 104 is fixed at the ground. In various embodiments, the bottom 144 of the street light pole 104 includes an enlarged mounting base for mounting to the ground. The base cavity 140 may be provided in the enlarged mounting base.

In an exemplary embodiment, the wire assembly 116 includes power feed wires 150 feeding power to the street light fixture 100. The wire assembly 116 may include signal wires, such as for communication with components at the street light head 102 or other accessories. The power feed wires 150 may be buried underground and extend into the street light pole 104 through the bottom 144. The power feed wires 150 provide high voltage AC power to the street light fixture 100. The base assembly 114 is electrically connected to the power feed wires 150.

In an exemplary embodiment, the wire assembly 116 includes power supply wires 152 extending between the street light head 102 and the base 106 of the street light pole 104. The base assembly 114 is electrically connected to the power supply wires 152. The light engine 130 of the head assembly 112 is electrically connected to the power supply wires 152. For example, the power supply wires 152 may be terminated to the circuit board 134 to power the LEDs 132. The power supply wires 152 extend between the electronics of the base assembly 114 and the light engine 130 of the head assembly 112 such that the electronics may be provided at the ground level while the light engine 130 may be provided at the above ground level in the street light head 102. The power supply wires 152 may provide DC power between the base assembly 114 and the head assembly 112. The power supply wires 152 extend through the interior of the street light pole 104 between the street light head 102 and the base 106 of the street light pole 104.

In an exemplary embodiment, the wire assembly 116 includes control wires 154. The control wires 154 extend along the street light pole 104, such as through the interior of the street light pole 104, between the street light head 102 and the base 106 of the street light pole 104. The base assembly 114 is electrically connected to the control wires 154. The head assembly 112 is electrically connected to the control wires 154. For example, the control wires 154 may be electrically connected to the control module 136. Signals from the control module 136 at the street light head 102 may be transmitted to the electronics of the base assembly 114 for operating the street light fixture 100.

In an exemplary embodiment, the wire assembly 116 may include an antenna wire (not shown) extending between the street light head 102 and the base 106. The antenna wire is coupled to a communication module at the base 106 and extends to an antenna mounted in the street light head 102 or in the control module 136.

Figure 2:
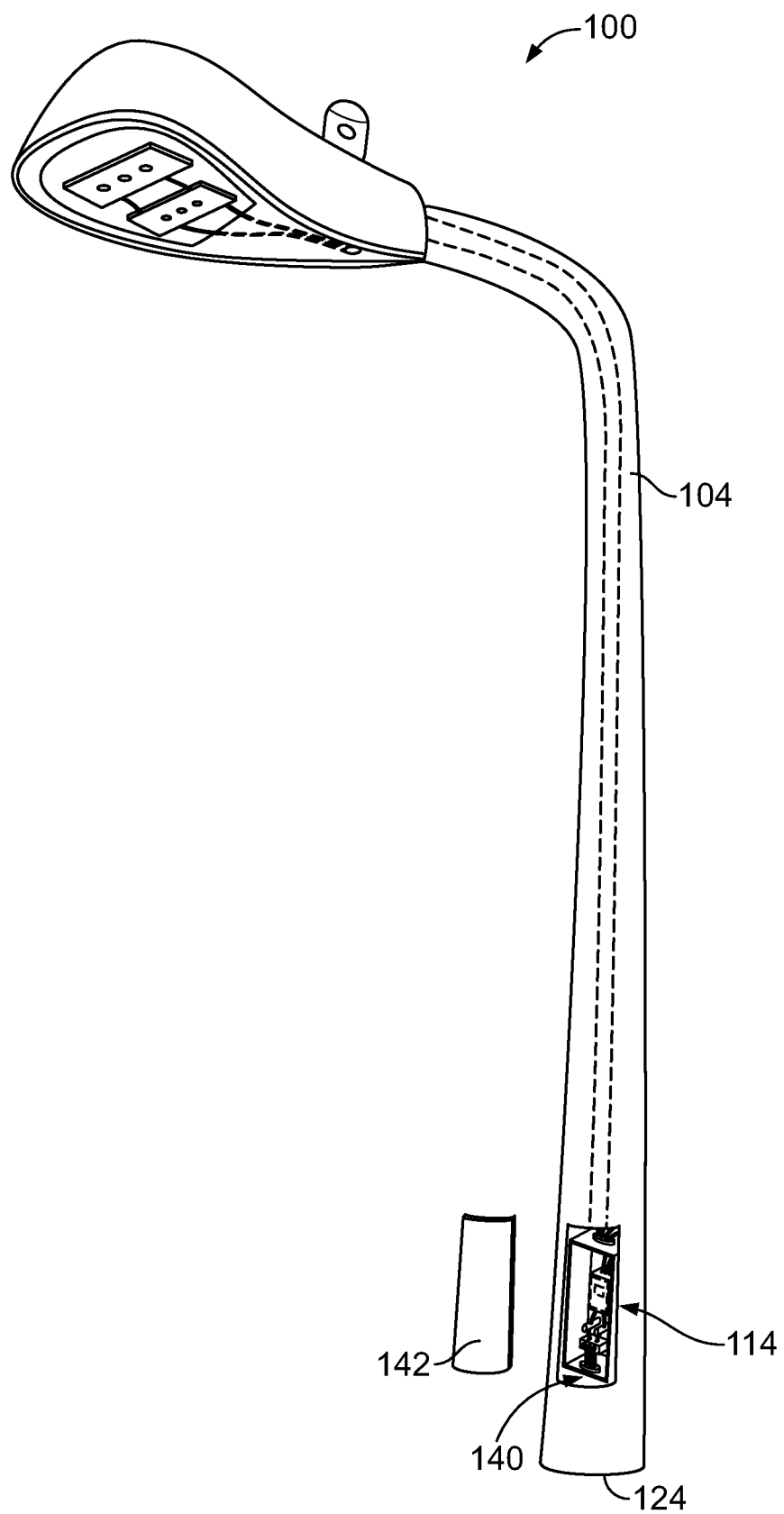
FIG. 2 illustrates the street light fixture in accordance with an exemplary embodiment showing the street light pole extending to the bottom without the enlarged mounting base.

FIG. 2 illustrates the street light fixture 100 in accordance with an exemplary embodiment showing the street light pole 104 extending to the bottom 124 without the enlarged mounting base. The street light pole 104 includes the base cavity 140 in the street light pole 104 with the access cover 142 removable from the street light pole 104 to access the base assembly 114. The base cavity 140 is sized and shaped differently in the embodiment illustrated in FIG. 2.

Figure 3:
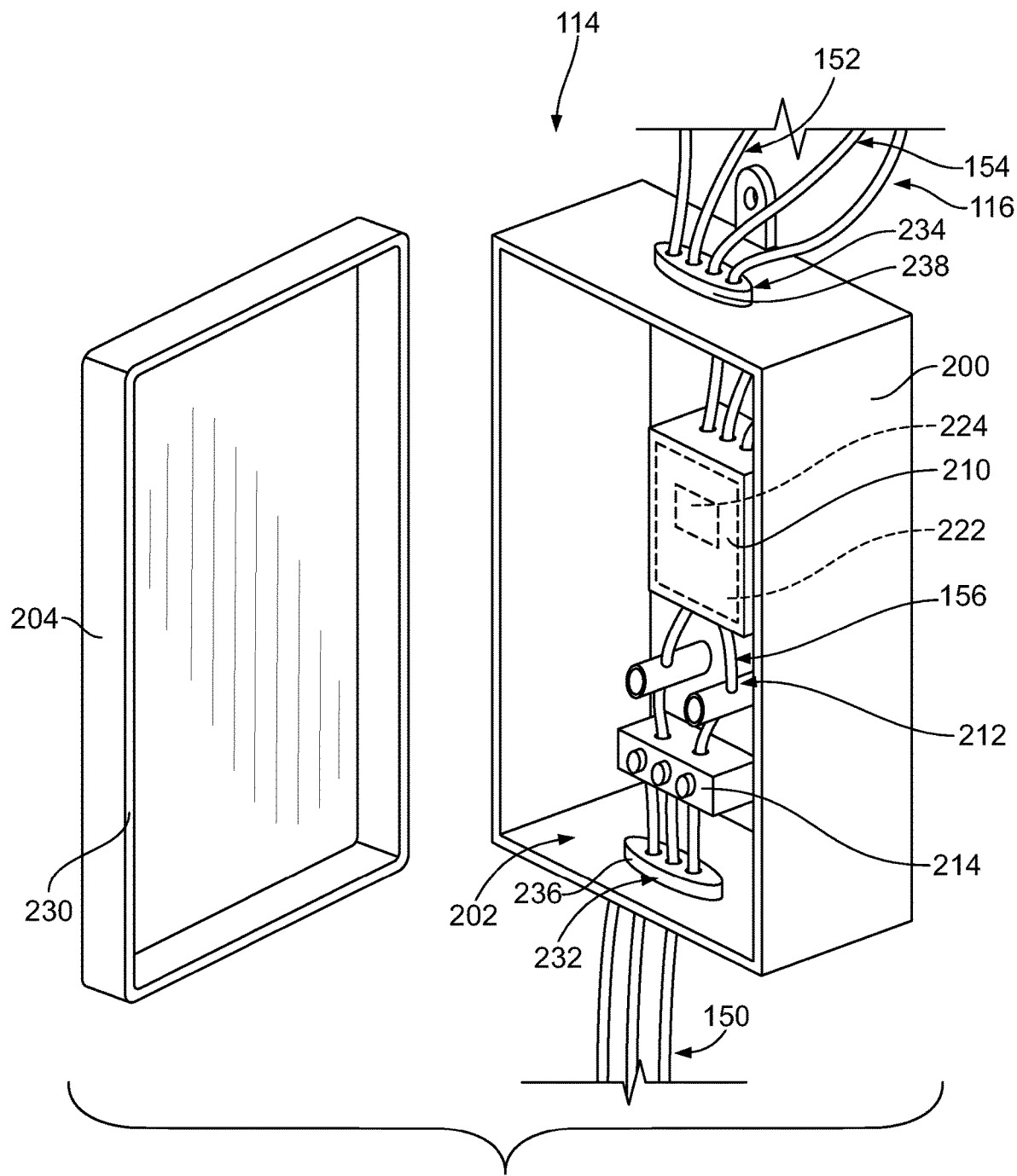
FIG. 3 is a front perspective view of the base assembly and the wire assembly of the street light fixture in accordance with an exemplary embodiment.

FIG. 3 is a front perspective view of the base assembly 114 and the wire assembly 116 of the street light fixture 100 in accordance with an exemplary embodiment. The base assembly 114 includes a housing 200 defining a chamber 202. A cover 204 is coupled to the housing 200 to close the chamber 202. The housing 200 is configured to be located inside the base 106 of the street light pole 104 (shown in FIG. 1). The power feed wires 150 are routed into the chamber 202 of the housing 200. The power supply wires 152 are routed into the chamber 202 of the housing 200. Electronics of the base assembly 114 electrically connect the power supply wires 152 and the power feed wires 150 within the housing 200. In an exemplary embodiment, the housing 200 is configured to be closed and sealed.

The base assembly 114 includes one or more power controllers 210 for controlling the power supply, such as between the power feed wires 150 and the power supply wires 152. In an exemplary embodiment, the power controller 210 may be used to supply power to the light engine 130 (shown in FIG. 1). In other various embodiments, the power controller 210 (or a second power controller) may be used to power other components at the street light head 102, such as the control module 136 (shown in FIG. 1), or other components, such as a camera or other powered device. In other various embodiments, the power controller 210 (or a second power controller) may be used to power components at the base 106 of the street light pole 104, such as an electric vehicle charging station or other AC power accessory mounted to the street light pole 104.

In the illustrated embodiment, the power supply wires 152 and the control wires 154 are terminated to the power controller 210. In various embodiments, the power feed wires 150 may be terminated to the power controller 210. For example, the wires may be soldered, crimped or otherwise terminated to contacts or a circuit board of the power controller 210. In an exemplary embodiment, the base assembly 114 includes one or more circuit protection devices 212 upstream of the power controller 210 to protect the power controller 210 and/or other electronics of the base assembly 114. Other types of electrical devices may be including in the base assembly 114, such as a communication module, an accessory device, a base power connector (for example, for powering a remote electric vehicle charging station), and the like.

In various embodiments, the base assembly 114 includes one or more terminal blocks 214 for terminating the wires within the housing 200, such as the power feed wires 150 within the housing 200. Optionally, the base assembly 114 may include a plurality of terminal blocks 214 within the housing 200, such as for terminating the power feed wires 150 and/or the power supply wires 152 and/or the control wires 154 and/or other wires of the wire assembly 116 to various components of the base assembly 114. For example, each of the electrical components (for example, the power controller 210, the circuit protection device 212, and the like) may include wire assemblies extending therefrom configured to be wired into the base assembly 114 using corresponding terminal blocks 214 held within the housing 200. Such terminal blocks may ease removal and replacement of the various electrical components during service.

In an exemplary embodiment, the wire assembly 116 includes connecting wires 156 within the housing 200 for connecting various electronic of the base assembly 114. For example, the connecting wires 156 may be connected between the terminal block 214 and the circuit protection device 212 and/or the connecting wires 156 may be connected between the circuit protection device 212 and the power controller 210. Connecting wires 156 may also be used to power other electronics located in the base assembly 114, such as microcontrollers or communication electronics.

The power controller 210 includes a controller housing 220 holding electronics therein. In an exemplary embodiment, the power controller 210 includes a controller circuit board 222 within the housing 220. The power controller 210 includes a driver 224, which may be coupled to the controller circuit board 222 or may be independent from the controller circuit board 222. The driver 224 may be an LED driver in various embodiments. The driver 224 may include an AC\DC converter. The driver 224 may include other electronics in alternative embodiments. The driver 224 may include capacitors, resistors, LEDs, transistors, inductors, integrated circuits, and the like. The power controller 210 may have other electronics provided on the controller circuit board 222. In various embodiments, the power controller 210 may include a memory, a processor, or other electronics for controlling the power circuit of the street light fixture 100. The power controller 210 may include a communication module for communicating with other components, such as components remote from the housing 200. For example, the communication module may communicate with the head assembly 112, such as the control module 136 (shown in FIG. 1). The communication module may communicate with a central communication system remote from the street light fixture 100 in various embodiments.

The circuit protection device 212 is provided upstream of the power controller 210 (for example, between the power controller 210 and the source of the power—the power feed wires 150) to protect the electronics of the power controller 210 and other components downstream of the power controller 210. In various embodiments, the circuit protection device 212 may include one or more surge protection devices to protect against power surges, such as from a lightning strike. In various embodiments, the circuit protection device 212 may include one or more fuses. Other types of circuit protection devices may be provided in alternative embodiments.

In an exemplary embodiment, the chamber 202 is sealed. For example, a perimeter seal 230 is provided between the cover 204 and the housing 200 area when the cover 204 is coupled to the housing 200, the chamber 202 is sealed. The cover 204 may be coupled to the housing 200 using one or more fasteners, clips, or other securing features. In an exemplary embodiment, the housing 200 includes an inlet 232, such as at a bottom of the housing 200, and an outlet 234, such as at the top of the housing 200. A first grommet 236 is provided at the inlet 232 and a second grommet 238 is provided at the outlet 234. The power feed wires 150 enter the housing 200 through the first grommet 236 at the inlet 232. The power supply wires 152 and the control wires 154 exit the housing 200 through the second grommet 238 at the outlet 234. The grommets 236, 238 are sealed to the housing 200. The grommets 236, 238 are sealed to the wires. Other types of seals may be provided in alternative embodiments.

The cover 204 is movable relative to the housing 200 to provide access to the chamber 202. During the life of the street light fixture 100, one or more of the electronics of the base assembly 114 may be repaired or replaced by accessing the housing 200 at the base 106 of the street light pole 104. For example, the power controller 210 may be repaired or replaced and/or the circuit protection devices 212 may be repaired or replaced. The wires of the wire assembly 116 may be accessed for servicing. By providing the control electronics of the base assembly 114 for the street light fixture 100 remote from the street light head 102 at the ground level, rather than high above the ground at the street light head 102, the control electronics are easily accessed for servicing. The base assembly 114 may be accessed by the service technician at the ground level rather than requiring a boom or lift to access the street light head 102. The control electronics may be more quickly accessed and serviced as compared to street lights having the control electronics in the street light head 102. The control electronics may be serviced by a single technician, rather than requiring an entire crew and/or shutdown of the street to access the street light head 102, such as with a lift or boom truck.

Figure 4:
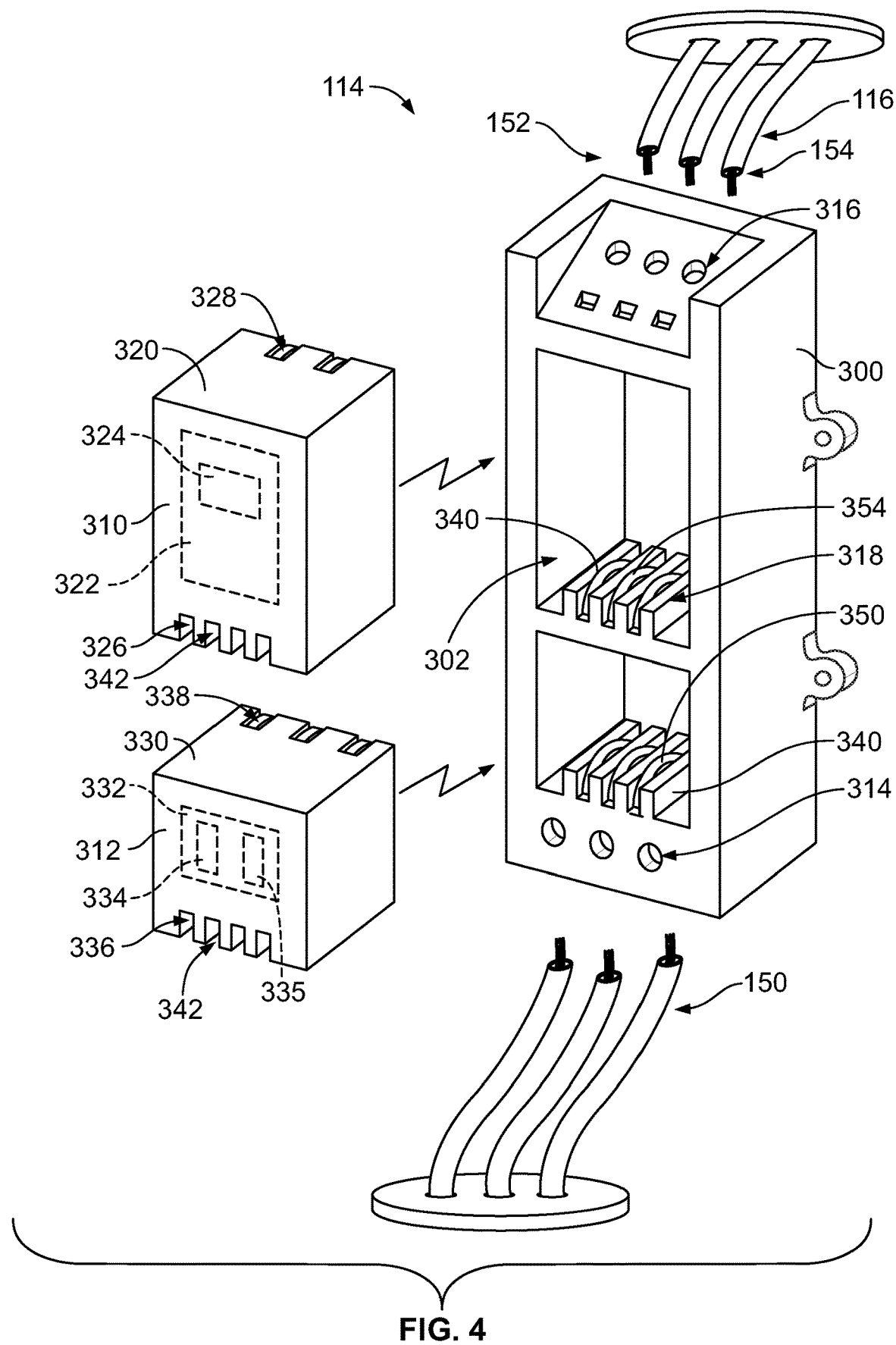
FIG. 4 is an exploded, front perspective view of the base assembly and the wire assembly of the street light fixture in accordance with an exemplary embodiment.

FIG. 4 is an exploded, front perspective view of the base assembly 114 and the wire assembly 116 of the street light fixture 100 in accordance with an exemplary embodiment. The base assembly 114 includes a housing 300 defining a chamber 302. A cover (not shown) may be provided and coupled to the housing 300 to close the chamber 302. The housing 300 is configured to be located inside the base 106 of the street light pole 104 (shown in FIG. 1). The power feed wires 150 are routed into the housing 300. The power supply wires 152 are routed into the housing 300. Electronics of the base assembly 114 electrically connect the power supply wires 152 and the power feed wires 150 within the housing 300.

In an exemplary embodiment, the electronics of the base assembly 114 are modular and are configured to be plugged into and removed from the housing 300 without connecting and un-connecting wires from the electronics. For example, in an exemplary embodiment, the base assembly 114 includes contacts having separable mating interfaces that allow the electronics to be pluggable into and removable from the housing 300. Any number of pluggable modules serving relative functions may be utilized within the base assembly 114, such as a power control module, a circuit protection module, a communication module, and the like. In other embodiments, the modules may be wired into the base assembly 114 rather than being pluggable at separable mating interfaces.

The base assembly 114 includes a power controller 310 for controlling the power supply between the power feed wires 150 and the power supply wires 152. In an exemplary embodiment, the base assembly 114 includes a circuit protection device 312 upstream of the power controller 310 to protect the power controller 310 and/or other electronics of the base assembly 114. In various embodiments, the base assembly 114 includes a terminal block 314 for terminating the power feed wires 150 within the housing 300 and a terminal block 316 for terminating the power supply wires 152 and the control wires 154 within the housing 300. In an exemplary embodiment, the base assembly 114 includes a terminal block 318 for terminating electrical components together, such as the power controller 310 and the circuit protection device 312.

In an exemplary embodiment, the housing 300 holds power terminals 350 configured to be electrically connected to the power feed wires 150, supply terminals 352 configured to be electrically connected to the power supply wires 152, and connecting terminals 354 configured to be electrically connected between various electrical components of the base assembly 114, such as between the power controller 310 and the circuit protection device 312. The power terminals 350 are part of the terminal block 314. The supply terminals 352 are part of the terminal block 316. The connecting terminals 354 are part of the terminal block 318. The power controller 310 controls a power supply of a power circuit from the power terminals 350 to the supply terminals 352.

The power controller 310 includes a controller housing 320 holding electronics therein. In an exemplary embodiment, the power controller 310 includes a controller circuit board 322 within the housing 320. The power controller 310 includes a driver 324, which may be coupled to the controller circuit board 322 or may be independent from the controller circuit board 322. The driver 324 may be an LED driver in various embodiments. The driver 324 may include an AC\DC converter. The driver 324 may include other electronics in alternative embodiments. The driver 324 may include capacitors, resistors, LEDs, transistors, inductors, integrated circuits, and the like. The power controller 310 may have other electronics provided on the controller circuit board 322. In various embodiments, the power controller 310 may include a memory, a processor, or other electronics for controlling the power circuit of the street light fixture 100. The power controller 310 may include a communication module for communicating with other components, such as components remote from the housing 300. For example, the communication module may communicate with the head assembly 112, such as the control module 136 (shown in FIG. 1). The communication module may communicate with a central communication system remote from the street light fixture 100 in various embodiments.

The power controller 310 includes first power controller contacts 326 and second power controller contacts 328. The power controller contacts 326, 328 are electrically connected to the controller circuit board 322. In the illustrated embodiment, the first power controller contacts 326 are provided at the first end, such as the bottom, of the controller housing 320 and the second power controller contacts 328 are provided at the second end, such as the top, of the controller housing 320. The power controller contacts 326, 328 may be contact pads, spring contacts, pin contacts, socket contacts, and the like defining separable mating interfaces. In alternative embodiments, the power controller contacts 326, 328 may be poke-in wire contacts configured to receive ends of wires. The wires may be terminated with screws or other compression terminations. The first power controller contacts 326 are configured be mated to corresponding connecting terminals 354 at a separable mating interface. The first power controller contacts 326 receive the power supply from upstream of the power controller 310. The second power controller contacts 328 are configured to be mated to corresponding supply terminals 352 at a separable mating interface. The second power controller contacts 328 transmit the power supply downstream of the power controller 310.

The circuit protection device 312 is provided upstream of the power controller 310 (for example, between the power controller 310 and the source of the power—the power feed wires 150) to protect the electronics of the power controller 310 and other components downstream of the power controller 310. The circuit protection device 312 includes a circuit protection device housing 330 holding electronics therein. In an exemplary embodiment, the circuit protection device 312 includes a device circuit board 332 within the housing 330. The circuit protection device 312 includes a surge protection device 334 coupled to the device circuit board 332 to protect against power surges, such as from a lightning strike. The circuit protection device 312 includes one or more fuses 335 coupled to the device circuit board 332. The circuit protection device 312 may have other protection devices provided on the controller circuit board 322.

The circuit protection device 312 includes first circuit protection contacts 336 and second circuit protection contacts 338. The circuit protection contacts 336, 338 are electrically connected to the device circuit board 332. In the illustrated embodiment, the first circuit protection contacts 336 are provided at the first end, such as the bottom, of the housing 330 and the second circuit protection contacts 338 are provided at the second end, such as the top, of the housing 330. The circuit protection contacts 336, 338 may be contact pads, spring contacts, pin contacts, socket contacts, and the like defining separable mating interfaces. In alternative embodiments, the circuit protection contacts 336, 338 may be poke-in wire contacts configured to receive ends of wires. The wires may be terminated with screws or other compression terminations. The first circuit protection contacts 336 are configured be mated to corresponding power terminals 350 at a separable mating interface. The first circuit protection contacts 336 receive the power supply from upstream of the circuit protection device 312. The second circuit protection contacts 338 are configured to be mated to corresponding connecting terminals 354 at a separable mating interface. The second circuit protection contacts 338 transmit the power supply downstream of the circuit protection device 312, such as to the power controller 310.

In an exemplary embodiment, the housing 300 includes touch protection features 340 adjacent the power terminals 350 and/or the supply terminals 352 and/or the connecting terminals 354. The touch protection features 340 makes the terminals touch safe. The touch protection features 340 electrically isolate the terminals from adjacent terminals. In the illustrated embodiment, the touch protection features are separating walls between the corresponding terminals. The separating walls extend beyond the mating interfaces of the corresponding terminals. In an exemplary embodiment, the housings 320, 330 includes slots or grooves 342 that receive the touch protection features 340 to allow the pluggable modules to mate with the terminals.

FIG. 5 is a cross-sectional view of a portion of the base assembly 114 in accordance with an exemplary embodiment. FIG. 6 is a cross-sectional view of the base assembly 114 in accordance with an exemplary embodiment. FIG. 5 illustrates the housing 300 holding the terminals 350, 352, 354 showing the wires 150, 152 poised for loading into the housing 300. The pluggable modules are not shown in FIG. 5 to illustrate the terminals 350, 352, 354 within the chamber 302. FIG. 6 illustrates the housing 300 with the pluggable modules plugged therein mated with the terminals 350, 352, 354.

The housing 300 extends between a top 360 and a bottom 362. The housing 300 includes an upper wall 364 at the top 360, a mid-wall 366 remote from the top 360 and remote from the bottom 362, and a lower wall 368 at the bottom 362. The chamber 302 extends between the upper wall 364 and the lower wall 368. The mid-wall 366 extends into the chamber 302 to divide the chamber 302 and two separate receptacles 370 the pluggable modules are configured be received in corresponding receptacles 370. For example, the power controller 310 is received in the upper receptacle between the mid-wall 366 and the upper wall 364 and the circuit protection device 312 is received in the lower receptacle between the mid-wall 366 and the lower wall 368. The housing 300 may include additional walls two separate the chamber 302 into more than two receptacles 370.

The power terminals 350 are held by the lower wall 368. The connecting terminals 354 are held by the mid-wall 366. The supply terminals 352 are held by the upper wall 364. Other arrangements are possible in alternative embodiments. The lower wall 368 includes an inlet 372 configured to receive the power feed wires 150. In an exemplary embodiment, the power feed wires 150 are received in a cage and terminated using a screw terminal 376 in the lower wall 368. The screw terminal 376 is used to electrically connect the power feed wire 150 and the power terminal 350. For example, the screw terminal 376 may be accessible at a front of the housing 300 and adjusted to tighten or loosen the screw terminal 376 to connect the power feed wire 150 and the power terminal 350. While the screw terminal 376 is shown, the wire connection may be a different type of termination, such as a poke-in termination, a cage-clamp style termination, and the like. The power terminal 350 include a mating beam 378 configured to be mated with the corresponding contact 336 of the circuit protection device 312. For example, the mating beam 378 extends into the lower receptacle 370 to interface with the circuit protection device 312. In the illustrated embodiment, the touch protection features 340 are provided adjacent the mating beams 378. While leaf-type mating beams 378 are shown, other electrical contact configurations such as pin contacts, blade contacts, socket contacts, pad contacts, spring contacts, or other contact interfaces are possible in alternative embodiments.

The upper wall 364 includes an outlet 374 configured to receive the power supply wires 152 and the control wires 154. In an exemplary embodiment, the power supply wires 152 may be poked into the outlet 374 to mate with the supply terminal 352 by a poke in wire connection. The supply terminal 352 includes a poke in spring beam 380 that is configured to engage the power supply wire 152. The spring beam 380 is deflectable to mate with the power supply wire 152 when the power supply wire 152 is poked into the upper wall 364. The supply terminal 352 includes a mating beam 382 opposite the spring beam 380 configured to be mated with the corresponding contact 328 of the power controller 310. For example, the mating beam 382 extends into the upper receptacle 370 to interface with the power controller 310. Optionally, touch protection features 340 may be provided adjacent the mating beam 382; however, in various embodiments, touch protection features 340 are not provided between adjacent mating beams 382. While leaf-type mating beams 382 are shown, other electrical contact configurations such as pin contacts, blade contacts, socket contacts, pad contacts, spring contacts, or other contact interfaces are possible in alternative embodiments.

The mid-wall 366 holds the connecting terminals 354. Each connecting terminal 354 includes a lower mating beam 384 and an upper mating beam 386. The lower mating beam 384 extends into the lower receptacle 370 to interface with the contact 338 of the circuit protection device 312. Optionally, touch protection features 340 may be provided adjacent the mating beam 384; however, in various embodiments, touch protection features 340 are not provided between adjacent mating beams 384. The upper mating beam 386 extends into the upper receptacle 370 to interface with the contact 326 of the power controller 310. Optionally, touch protection features 340 may be provided adjacent the mating beams 386. While leaf-type mating beams 384, 386 are shown, other electrical contact configurations such as pin contacts, blade contacts, socket contacts, pad contacts, spring contacts, or other contact interfaces are possible in alternative embodiments.

During the life of the street light fixture 100, one or more of the electronics of the base assembly 114 may be repaired or replaced by accessing the housing 300 at the base 106 of the street light pole 104. For example, the power controller 310 may be repaired or replaced and/or the circuit protection devices 312 may be repaired or replaced. By providing the control electronics of the base assembly 114 for the street light fixture 100 remote from the street light head 102 at the ground level, rather than high above the ground at the street light head 102, the control electronics are easily accessed for servicing. The base assembly 114 may be accessed by the service technician at the ground level rather than requiring a boom or lift to access the street light head 102. The control electronics may be more quickly accessed and serviced as compared to street lights having the control electronics in the street light head 102. The control electronics may be serviced by a single technician, rather than requiring an entire crew and/or shutdown of the street to access the street light head 102, such as with a lift or boom truck.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A street light fixture comprising:
a street light head having a cavity, the street light head having a lens;
a street light pole having a base and a head end opposite the base, the street light head being provided at the head end of the street light pole, the base having a base cavity located remote from the street light head; and
a light fixture assembly having a head assembly, a base assembly and a wire assembly, the head assembly received in the cavity of the street light head, the head assembly including a light engine positioned proximate to the lens for generating light from the street light fixture, the base assembly received in the base cavity of the base of the street light pole remote from the street light head, the base assembly including a housing having at least one chamber wall forming a chamber, the at least one chamber wall of the housing holding power terminals in fixed positions relative to the housing, the power terminals each including a power terminal body including a deflectable mating beam being cantilevered from the at least one chamber wall and extending into the chamber, the mating beams of the power terminals having separable mating interfaces, the power terminals configured to be electrically connected to power feed wires, the housing holding supply terminals in fixed positions relative to the housing, the supply terminals each including a supply terminal body including a deflectable mating beam being cantilevered from the at least one chamber wall and extending into the chamber, the mating beams of the supply terminals having separable mating interfaces, the supply terminals electrically connected to power supply wires of the wire assembly, the base assembly including a power controller configured to receive power from the power feed wires feeding power to the street light fixture, the power controller pluggable into the chamber to electrically connect to the power terminals and the supply terminals, the power controller engaging and deflecting the mating beams of at least one of the power terminals and the supply terminals when plugged into the chamber to electrically connect to the corresponding separable mating interfaces of at least one of the power terminals and the supply terminals, the power controller controlling a power supply from the power terminals to the supply terminals, the wire assembly having the power supply wires extending between the street light head and the base of the street light pole, the power supply wires coupled to the power controller and coupled to the light engine to supply power from the power controller to the light engine.

2. The street light fixture of claim 1, wherein the power supply wires of the wire assembly extend through an interior of the street light pole between the head end of the street light pole and the base of the street light pole.

3. The street light fixture of claim 1, wherein the light engine is an LED light engine and the power controller is an LED driver for controlled power supply to the LED light engine.

4. The street light fixture of claim 1, wherein the head assembly includes a control module having an environmental sensor, the wire assembly including control wires coupled to the control module at the head assembly and the power controller at the base assembly, the power controller being operated based on signals from the control module.

5. The street light fixture of claim 4, wherein the environmental sensor is a photocell sensing daylight levels exterior of the street light head.

6. The street light fixture of claim 1, wherein the base assembly further comprises a circuit protection device received in the street light pole, the circuit protection device being electrically coupled between the power feed wires and the power controller.

7. The street light fixture of claim 1, wherein the base of the street light pole and the power controller are located at a ground level and wherein the street light head and the light engine are located at an above-ground level with the wire assembly extending between the ground level and the above-ground level.

8. The street light fixture of claim 1, wherein the base assembly includes the housing enclosing the chamber, the power controller contained within the chamber of the housing, the light engine located outside of the housing, the housing having an access opening providing access to the chamber.

9. The street light fixture of claim 8, wherein the housing is sealed having a first grommet at an inlet of the housing and a second grommet at an outlet of the housing, the power feed wires entering the housing through the first grommet, the power supply wires exiting the housing through the second grommet.

10. The street light fixture of claim 1, wherein the power controller of the base assembly is removably received in the chamber of the housing.

11. The street light fixture of claim 1, wherein the power controller includes first power controller contacts and second power controller contacts, the first power controller contacts being electrically connected to the power terminals, the second power controller contacts being mated to the supply terminals at a separable mating interface.

12. The street light fixture of claim 1, wherein the base assembly further comprises a circuit protection device received in the housing, the circuit protection device being coupled to the power terminals upstream of the power controller.

13. The street light fixture of claim 1, wherein the housing includes touch protection features adjacent the power terminals to make the power terminals touch-safe.

14. The street light fixture of claim 1, wherein the base assembly includes a terminal block configured to receive the power feed wires, the wire assembly further comprising connecting wires between the terminal block and the power controller.

15. The street light fixture of claim 1, wherein the base assembly includes terminal blocks, the power feed wires being terminated to one of the terminal blocks, the power supply wires being terminated to one of the terminal blocks, the power controller being terminated to at least one of the terminal blocks.

16. The street light fixture of claim 1, wherein the base assembly includes a housing removably received in the street light pole, the housing having a chamber receiving the power controller, the housing having a cover movable relative to the housing to provide access to the chamber.

17. The street light fixture of claim 1, wherein the base assembly includes a second power controller configured to receive power from the power feed wires, the second power controller powering a powered component separate from the light engine.

18. A light fixture assembly for a street light fixture, the light fixture assembly comprising
a head assembly configured to be received in a cavity of a street light head of the street light fixture, the head assembly including a light engine for generating light from the street light fixture;
a base assembly separate and discrete from the head assembly, the base assembly configured to be coupled to a street light pole at a base of the street light pole remote from the street light head, the base assembly including a housing having a chamber, the housing holding power terminals in fixed positions relative to the housing, the power terminals each including a power terminal body including a deflectable mating beam, the mating beams of the power terminals having separable mating interfaces, the power terminals configured to be electrically connected to power feed wires, the housing holding supply terminals in fixed positions relative to the housing, the supply terminals each including a supply terminal body including a poke-in spring beam and a deflectable mating beam opposite the poke-in spring beam, the mating beams of the supply terminals having separable mating interfaces, the base assembly including a power controller configured to receive power from the power feed wires feeding power to the street light fixture, the power controller pluggable into the chamber to electrically connect to the power terminals and the supply terminals, the power controller being electrically connected to the separable mating interfaces of at least one of the power terminals and the supply terminals, the power controller controlling a power supply from the power terminals to the supply terminals; and
a wire assembly having power supply wires configured to extend between the street light head and the base of the street light pole, the power supply wires coupled to the poke-in spring beams of the supply terminals by poke-in electrical connections, the power supply wires electrically connecting the power controller and the light engine to supply power from the power controller to the light engine.

19. The light fixture assembly of claim 18, wherein the base assembly includes the housing enclosing the chamber, the power controller contained within the chamber of the housing, the light engine located outside of the housing, the housing having an access opening providing access to the chamber.

20. A light fixture assembly for a street light fixture, the light fixture assembly comprising
a head assembly configured to be received in a cavity of a street light head of the street light fixture, the head assembly including a light engine for generating light from the street light fixture;
a base assembly separate and discrete from the head assembly, the base assembly configured to be coupled to a street light pole at a base of the street light pole remote from the street light head, the base assembly including a housing having at least one chamber wall forming a chamber, the at least one chamber wall of the housing holding power terminals in fixed positions relative to the housing, the power terminals having mating beams including separable mating interfaces, the power terminals configured to be electrically connected to power feed wires feeding power to the street light fixture, the housing holding supply terminals in fixed positions relative to the housing, the supply terminals having mating beams including separable mating interfaces, the housing holding connecting terminals in the chamber, the connecting terminals having first mating beams and second mating beams, the base assembly including a power controller pluggable into the chamber to electrically connect to the power terminals and the connecting terminals, the power controller engaging and deflecting the mating beams of the power terminals and engaging and deflecting the first mating beams of the connecting terminals when plugged into the chamber, the base assembly including a circuit protection device pluggable into the chamber to electrically connect to the supply terminals and the connecting terminals, the circuit protection device engaging and deflecting the mating beams of the supply terminals and engaging and deflecting the second mating beams of the connecting terminals when plugged into the chamber, the power controller and the circuit protection device controlling a power supply from the power terminals to the supply terminals; and a wire assembly having power supply wires configured to extend between the street light head and the base of the street light pole, the power supply wires coupled to the supply terminals, the power supply wires coupled to the light engine, the power supply wires supplying power from the power controller to the light engine.

\* \* \* \* \*